Fig. 1.

July 9, 1935.    H. O. FLETCHER    2,007,827
MILLING MACHINE
Filed July 5, 1934    10 Sheets-Sheet 2

INVENTOR:
Henry O. Fletcher

July 9, 1935.  H. O. FLETCHER  2,007,827

MILLING MACHINE

Filed July 5, 1934   10 Sheets-Sheet 5

INVENTOR:
Henry O. Fletcher.

July 9, 1935. H. O. FLETCHER 2,007,827
MILLING MACHINE
Filed July 5, 1934 10 Sheets-Sheet 8

INVENTOR:
Henry O. Fletcher

July 9, 1935. H. O. FLETCHER 2,007,827
MILLING MACHINE
Filed July 5, 1934 10 Sheets-Sheet 9

INVENTOR:
Henry O. Fletcher.

Patented July 9, 1935

2,007,827

UNITED STATES PATENT OFFICE 2,007,827

MILLING MACHINE

Henry O. Fletcher, Manchester, N. H.

Application July 5, 1934, Serial No. 733,785

16 Claims. (Cl. 90—15.1)

My invention relates to milling machines, and more especially to the semi-automatic type, in which the work is held by an intermittently movable work holder, the only requirement of the operator being to remove the finished work and clamp a new piece of work in place for operation thereon while the machine is in operation.

The feeding movement is effected by hydraulic means, provision being made for extremely fine, and wide, adjustment which may be quickly and easily accomplished.

The movements of the cutter, and the locking and index movements of the turret are also effected by hydraulic means, in a manner that prevents any tendency of turret rotation until the cutter is entirely free from interference with the moving parts, and the turret locking device has acted to free the turret. This is accomplished by controlling the turret lock by the movements of the cutter, which will hereinafter be explained.

One object of my invention is to, as much as possible, relieve the operator from attention to the operation of the machine. Another object is to provide a wide range of feeds and speeds to meet the requirements of various up to date materials used in the manufacture of machine parts and cutters. Another object is to provide a constant, and even, pressure on the cutters while they are operating on the work, thus preventing vibration, and insuring accuracy and better quality of work.

Other objects are to conserve power, reduce vibration, noise, and wear of parts, cheapen and facilitate manufacture, guard against accidents, increase speed, and facilitate operation.

In the drawings

Fig. 10 is a front sectional elevation, taken on line 10—10 of Fig. 2, showing the cutter driving and raising mechanism.

Figs. 11, 12, 15 and 17 are sectional side elevations, and Figs. 13, 14, 16, and 18 are sectional end elevations of the control valve, showing it in the various positions of its operation.

Fig. 31 is a plan view.

Figs. 33 and 35 are plan views, and Figs. 34 and 36 are side elevations, respectively, of the tripping mechanism employed in the embodiment shown in Figs. 30 to 32.

Referring to the drawings the motor 1 is mounted within base 2, and drives the constant pressure, varying volume, hydraulic pump 3, which takes fluid from tank 4 through suction pipe 5, and delivers the fluid under pressure through pipe 6, to valve 7, which in turn distributes it to the various hydraulic motors.

The carriage, or slide, 8 reciprocates in ways 9, formed in table 10, and is propelled by piston 11 of hydraulic motor cylinder 12. Cylinder 12 is mounted rigidly on yoke 12a which is securely fastened to table 10. The slide 13, to which cutters 15 are attached, reciprocates on ways 14, formed on carriage 8, and serves to raise the cutters to clear the work, while the work-holding turret 85 rotates to present a new piece of work for operation thereon.

Hydraulic motor 16 is attached to carriage 8, and serves to raise and lower slide 13 by means of piston 17 and rod 18.

The reducing unit 19 is driven by motor 1, and drives the bevel pinion 20 by means of upright shaft 21. Bevel gear 22 is integral with clutch driving member 24 and meshes with pinion 20. The clutch driving member 24, is freely mounted on shaft 23, and is adapted to engage driven member 25 fast on shaft 23. Pinion 26 is also fast on shaft 23, and gear 27, fast on shaft 28 meshes with pinion 26.

The valve rotor 29 is fast on shaft 28, and intermittently rotates with shaft 28. The clutch 24, may be of any standard type, the one shown consisting of the well known type controlled by a cage, and engages automatically upon releasing the lug 30, and disengages when lug 30 is engaged by either of the levers 31 or 32.

Levers 31 and 32 are fast on shaft 34, and levers 32 and 35 are fast on shaft 36. The spring 37 tends to draw the upper arms of lever 31 and lever 32 together, and to hold lugs 38 and 39, formed on levers 31 and 32, respectively, in the path of clutch lug 30. The pins 40 engage the lower ends of lever 31 and 32, limiting their movement, to prevent interference with the clutch by lugs 38 and 39.

The trip rod 41 slides in bearings 42, and carries collars 43, 44, 45 and 46 fast thereon. Levers 33 and 35 are forked at their lower ends through which the rod 41 passes, and are engaged by collars 46 and 45, respectively. When rod 41 slides to the left (Fig. 1) collar 46 engages lever 33, rotating it, together with shaft 34 and lever 31 clockwise, releasing lug 38 from contact with clutch lug 30, thus engaging the clutch, which rotates driven member 25 and pinion 26, anticlockwise, half a revolution. As the ratio of gear 27 to pinion 26 is four to one, the shaft 28 and valve rotor 29 will rotate clockwise one eighth of a revolution.

When rod 41 slides to the right collar 45 engages lever 35 thus disengaging lug 39 from clutch lug 30 and thereby again rotating valve rotor 29.

The lever 47, fast on shaft 48, is forked at its lower end straddling rod 41, and engages collar 43 when moved to the left, and collar 44 when moved to the right. The lever 49, on which rolls 50 and 51 are mounted, is also fast on shaft 48.

The plate 52 (Figs. 1, 19, 20, 21 and 22), is fast on slide 13, and partakes of the various movements of slide 13, and carriage 8. Trip blocks 53 and 54 are fastened to plate 52, adjustably or stationary as desired, and are adapted to engage rolls 50 and 51 as will be presently explained.

The movements of cutter 15 are as follows: With slide 13 lowered the carriage 8 is fed slowly forward while the cutters are performing the desired operation on the work 55, (in the case shown the cutters trim the two ends of the work piece 55), until block 54 engages roll 51, (Fig. 19), turning lever 49, shaft 48 and lever 47 clockwise into the position shown in Fig. 19. This movement slides rod 41 to the left, and results in turning rotor 29 one eighth revolution as previously described.

Figures 10, 13, 14, 15, 16, 18:
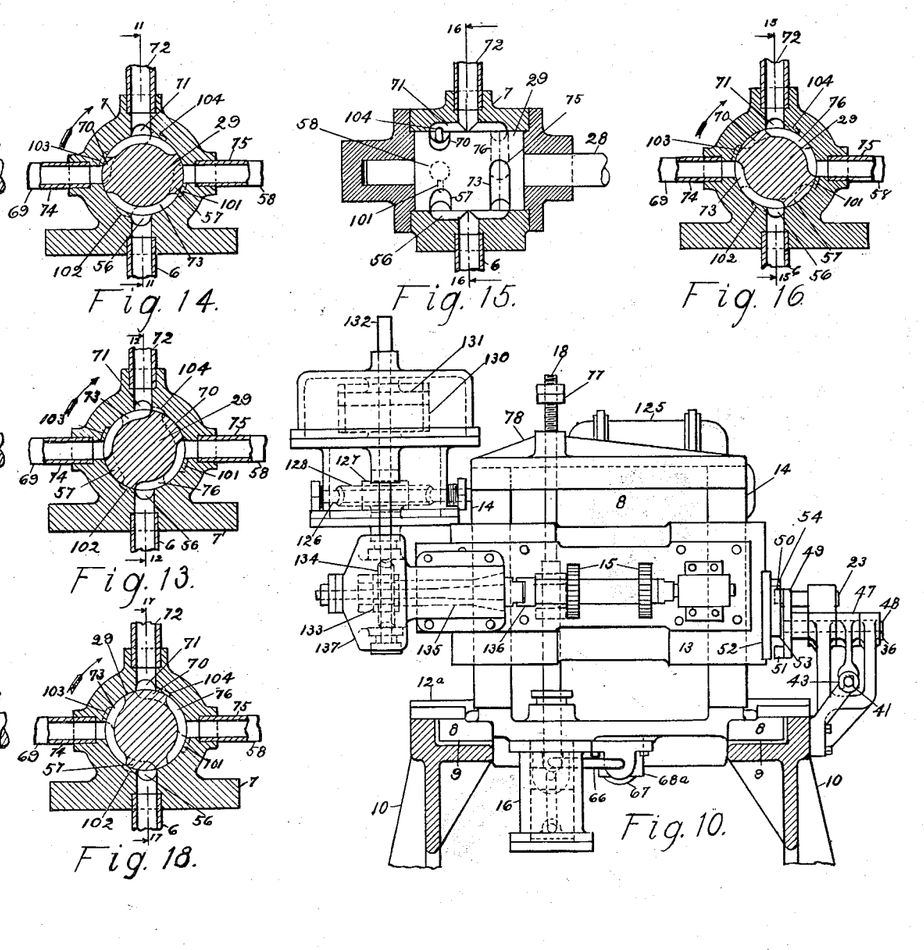
Figure 11:
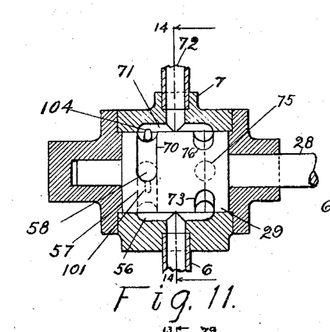

Valve rotor 29 is timed so that this movement places it in the position shown in Figs. 11 and 14. The fluid enters from pipe 6, passes through passage 56, formed in valve body 7, passage 57, in rotor 29, pipe 58, hollow piston rod 59, holes 60 in piston rod 59, cylinder 61, pipe 62, to the lower end of motor cylinder 16, raising piston 17 and rod 18, thus raising slide 13 by means of lug 63, formed on raising slide 13, to which piston rod 18 is adjustably attached by means of adjusting nuts 64 and 65.

As piston 17, and slide 13, raise the exhaust fluid flows from the upper end of cylinder 16 through pipe 66, cylinder 67, hollow piston rod 68, pipe 69, to passage 70 in rotor 29, passage 71 in valve body 7, and exhaust pipe 72 to tank 4.

Figure 1:
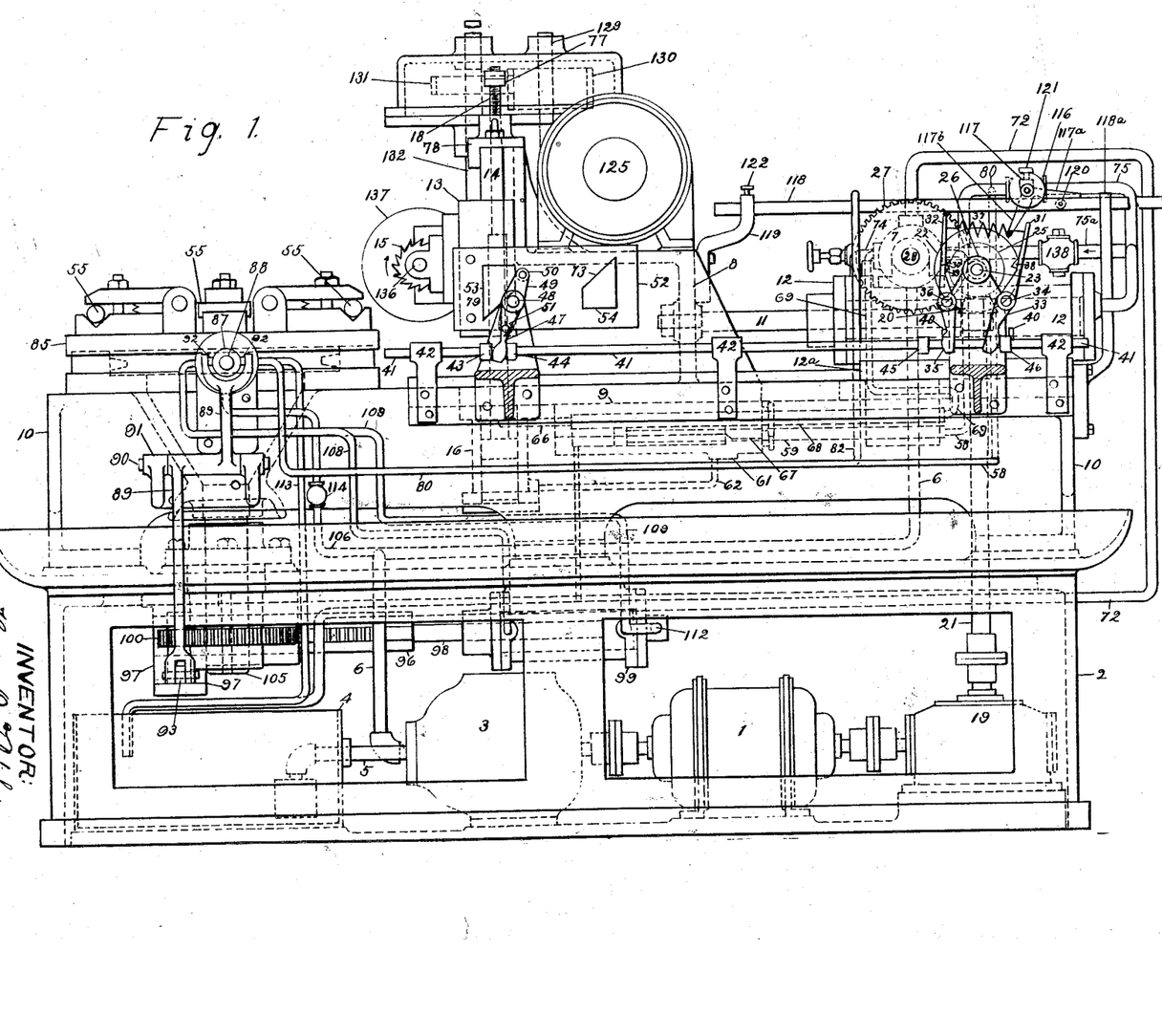
Fig. 1 is a side elevation of one embodiment of my invention with cover plates removed, and parts broken away, to reveal as much of the mechanism as possible.
Figures 2, 19, 20, 21, 22:
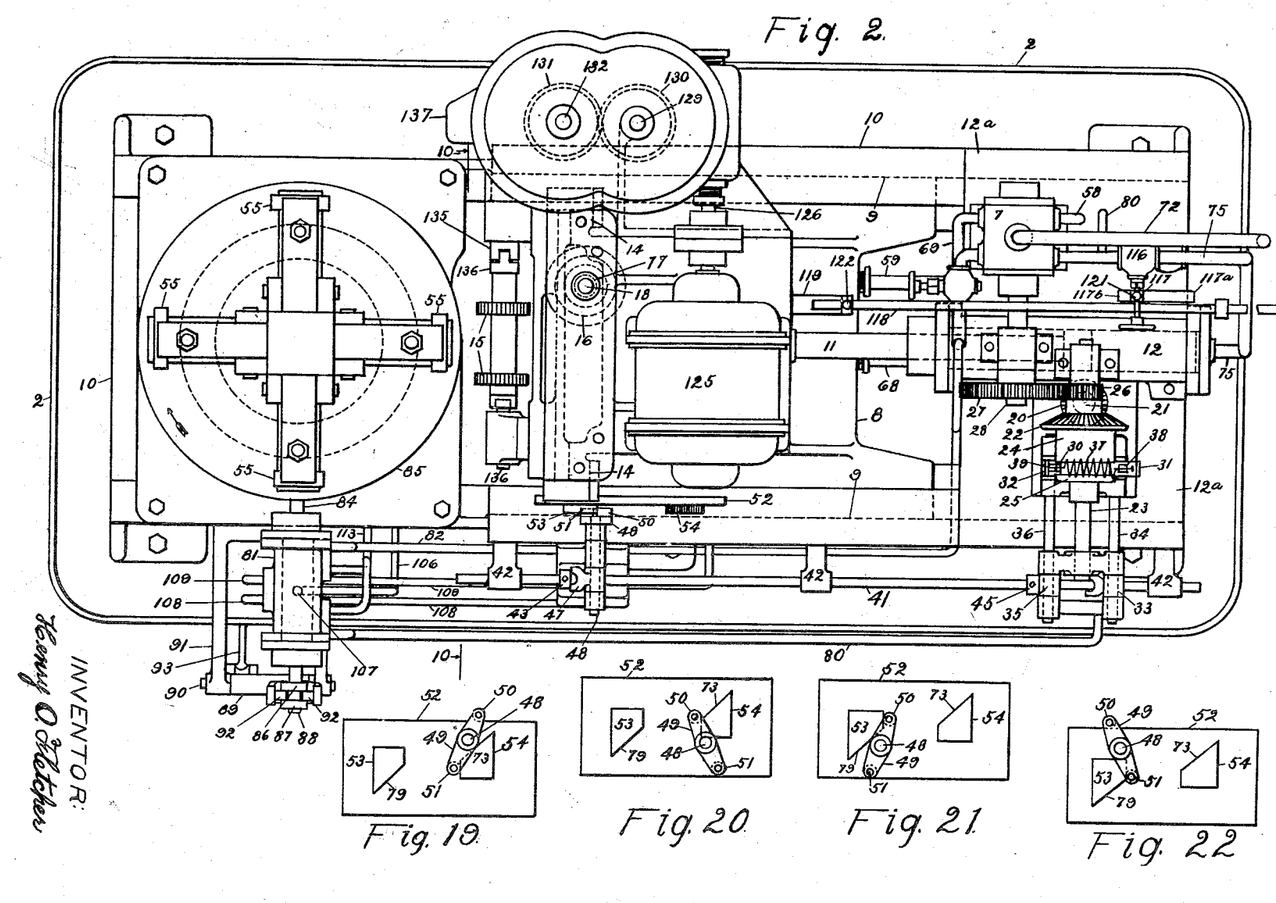
Fig. 2 is a plan view looking on the top of Fig. 1.
Figs. 19 to 22 are side elevations showing the trip blocks and lever for actuating the control valve when horizontal feed is used.
Figures 6, 7, 8, 9, 23:
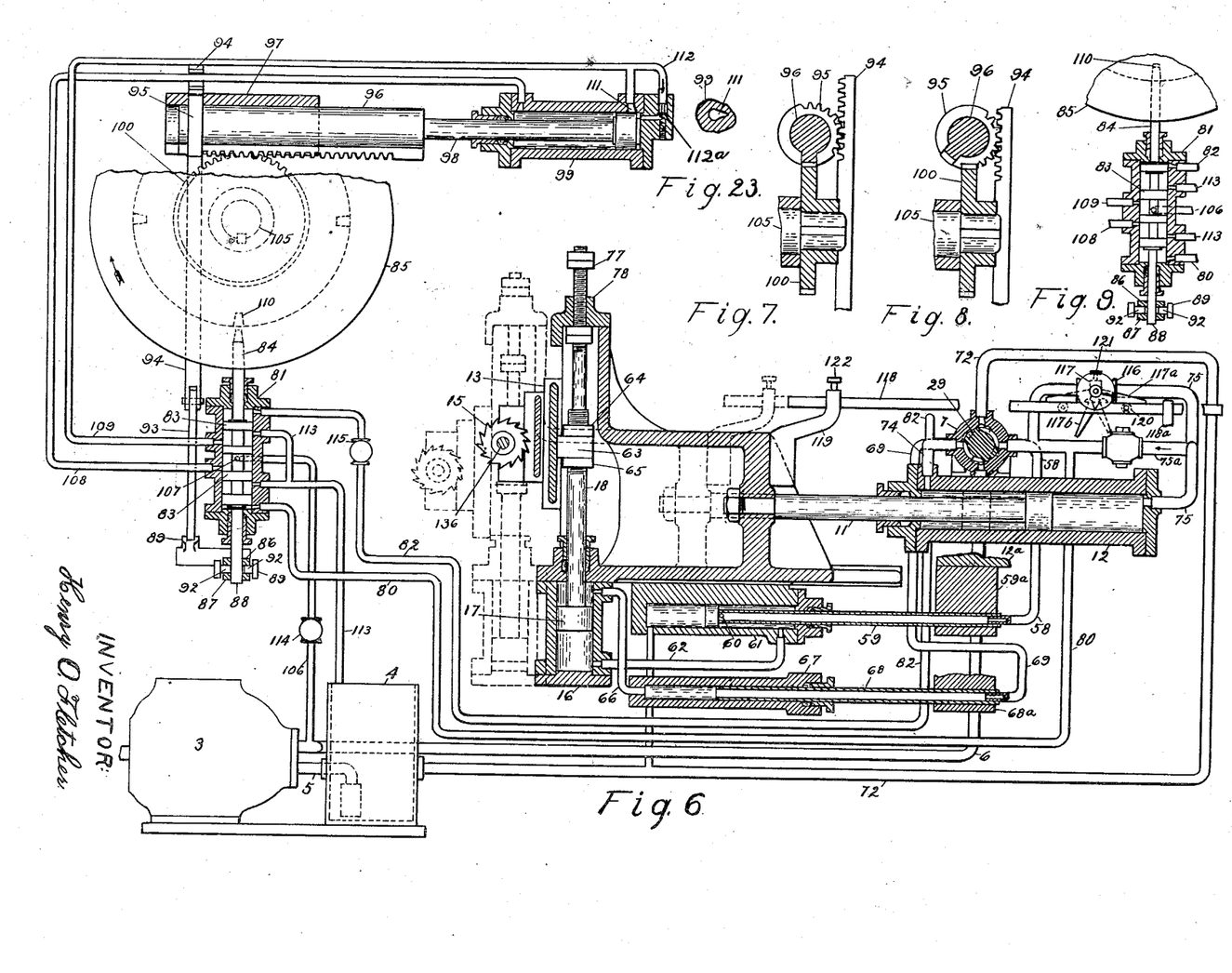
Fig. 6 is a diagrammatical view illustrating the hydraulic system of operation.
Figs. 7 and 8 are sectional fragmental views showing the manner of connecting and disconnecting the turret rotating device.
Fig. 9 is a sectional plan view of the combination turret locking motor, showing the turret locked.
Fig. 23 is a fragmental section of the turret motor cylinder wall showing the form of exhaust port.

Slide 13 raises until the cam surface 73, of block 54, engages roll 50, as shown in Fig. 20, turning lever 49 anticlockwise and engaging the clutch 25 to turn the valve rotor 29, into the position shown in Figs. 15 and 16. The fluid enters through pipe 6, passes through passage 56, passage 73, pipe 74 to the left hand end of cylinder 12, forcing piston 11 to the right. (Figs. 1 and 6.) Piston 11 is fastened to carriage 8 as shown, and this movement draws carriage 8 to the right retracting cutter 15 from work 55. During this movement the exhaust fluid passes from the right end of cylinder 12 through pipes 75 and 75a, passage 76, pipe 72 to tank 4.

Figure 17:
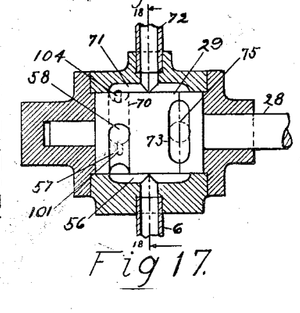

As carriage 8 retracts to the end of its movement, block 53 engages roll 50, turning lever 49 into the position shown in Fig. 21, and slides rod 41 to the left thus causing rotor 29 to assume the position shown in the Figs. 17 and 18. The fluid enters through pipe 6, flows through passage 56, passage 57, pipe 69, rod 68, cylinder 67, pipe 66, to upper end of cylinder 16 lowering slide 13, and cutters 55, until the adjusting nut 77 engages the yoke 78; the exhaust flowing from the lower end of cylinder 16 through pipe 62, cylinder 61, rod 59, pipe 58, passage 70, passage 71, pipe 72 to tank 4.

Figure 12:
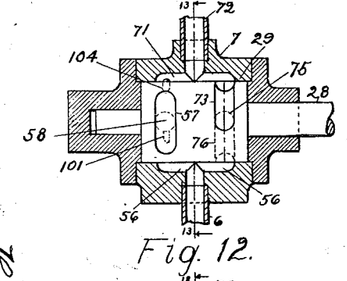

As slide 13 lowers toward the end of its movement the cam surface 79, of block 53, engages roll 51 to turn lever 49 anticlockwise as shown in Fig. 22, which slides rod 41 to the right and resulting in rotor 29 assuming the position shown in Figs. 12 and 13.

The fluid enters from pipe 6 flowing through passages 56 and 76 and pipe 75, to right end of cylinder 12, to force piston 11 and carriage 8 to the left, and feeds the cutters 55 forward to perform their operation on a new piece of work.

The small passages 101, 102, 103 and 104, formed in valve body 7 are for the purpose of keeping up the pressure in cylinder 16 after valve rotor 29 has operated to supply fluid to cylinder 12.

Cylinder 61 and 67 are attached to carriage 8, and partake of the movement thereof; and hollow pistons 59 and 68 are held stationary by bearings 59a and 68a, respectively, attached to the stationary yoke 12a, so that these pistons and cylinders form telescoping joints to supply fluid to the moving motor 16 from a stationary source, the small passages 101 to 104 allowing fluid to flow into, or out of, cylinders 61 and 67 even after valve rotor 29 has operated to supply fluid to cylinder 12.

It will be seen that the pressure exerted in cylinders 61 and 67 tend to help, rather than hinder, the movement of carriage 8 as it is reciprocated in either direction by motor 12.

Referring more especially to Figs. 1 to 3 and 6 to 9, it will be noticed that pipe 80 leads from pipe 75a to the rear end of turret locking motor 81, and that pipe 82 leads from 74 to the front end of motor 81, so that when valve 7 delivers fluid through pipe 74 to the left hand end of cylinder 12 to retract carriage 8, fluid also flows through pipe 82, to force piston 83 and lock rod 84 away from turret 85, withdrawing rod 85 from the tapered hole 110 in turret 85, thus allowing free rotation thereof.

Collars 86 and 87 are fast on the rear end 88, of rod 84, and lever 89 fulcrumed at 90 in bracket 91 is forked at its upper end straddling rod 88, the pins 92 extending inwardly from the two prongs thereof, and between collars 86 and 87, are engaged thereby to impart movement to lever 89 as piston 83 is impelled in either direction. The connecting rod 93, pivotally connected, at one end, to the lower end of lever 89, and at the other end to rack 94 serves to reciprocate rack 94 as lever 89 is rotated on fulcrum 90 by the movement of piston 83. Rack 94 meshes with segment 95, which is loosely mounted on the cylindrical shaped rack 96, and is held from partaking of the sliding movement of rack 96 in either direction by bearing 97, which also serves as a bearing for racks 94 and 96.

Rack 96 is attached to piston 98, which reciprocates in motor cylinder 99, and meshes with gear 100, fast on turret spindle 105, serving to rotate turret, or work table 85, when fluid pressure is applied to the piston end of cylinder 99, which will hereinafter be explained.

When valve 7 delivers fluid to cylinder 12 to advance carriage 8 toward turret 85, the fluid is also delivered, through pipe 80, to the rear end of motor cylinder 81, thus forcing the lock bolt 84 into one of the tapered holes 110 in turret 85 to firmly hold the same from movement while the cutters 15 are operating on work 55. Segment 95 is fitted to the contour of rack 96 so that, during the movement of piston 83, to lock turret 85, it will be seen that the resulting movement of lever 89, and rack 94, will rotate segment 95 and rack 96 to the position shown in Fig. 8 with the teeth of rack 96 out of mesh with gear 100. This is accomplished by providing clearance on one half the width of the teeth of rack 96. As piston 83 moves to unlock turret 85, the resulting movement of lever 89, and rack 94, rotates segment 95, and rack 96 to the position shown in Fig. 7, with rack 96 in mesh with gear 100, ready to rotate turret 85.

Pressure supply pipe 106 delivers fluid through port 107, to cylinder 81, and pipe 108 connects cylinder 81 with the left hand end of cylinder 99, and pipe 109 connects cylinder 81 with the right hand end of cylinder 99 as shown.

The movement of piston 83 is greater than is required to withdraw lock-bolt 84 from hole 110, and the excess movement is utilized for connecting supply port 107 with pipe 108 for supplying fluid to cylinder 99 to force piston 98 to the right; and, as previously explained, rack 96 is in mesh with gear 100 at this time, resulting in rotation of turret 85.

As piston 83 acts to lock turret 85, rack 96 is disengaged from gear 100, as previously explained, and the latter part of the movement of piston 83 connects port 107 with pipe 109 for supplying fluid under pressure to return piston 98 to its initial position. (See Fig. 9.)

Figures 24, 25, 26, 27, 28, 29:
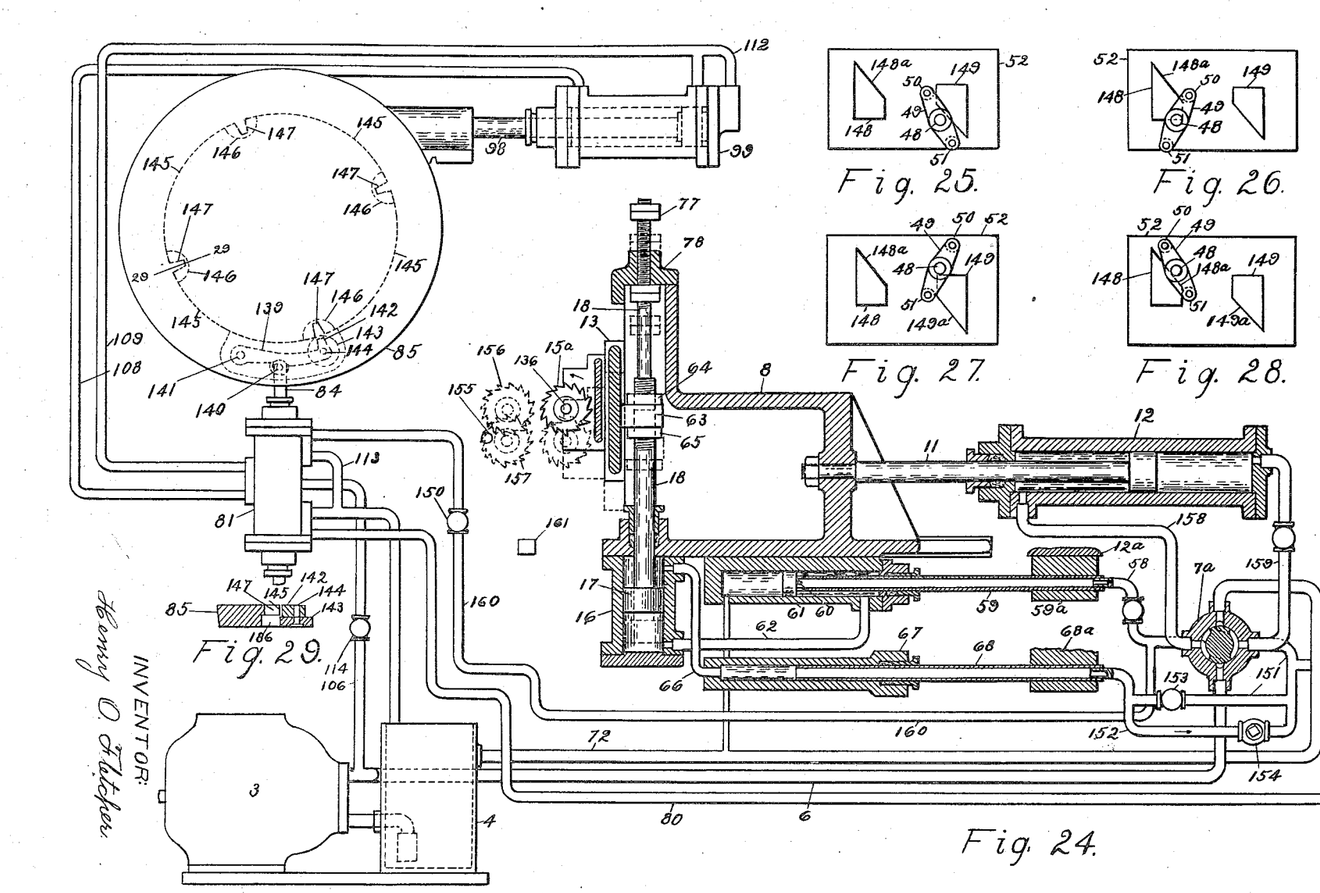
Fig. 24 is a diagrammatical view showing the hydraulic system used when the operation requires a downwardly feeding movement of the cutters.
Figs. 25 to 28 are side elevations showing the trip blocks, and lever operation for actuating the control valve when a down feed of the cutter is required.
Fig. 29 is a sectional view taken on line 29—29 of Fig. 24.
Figure 30:
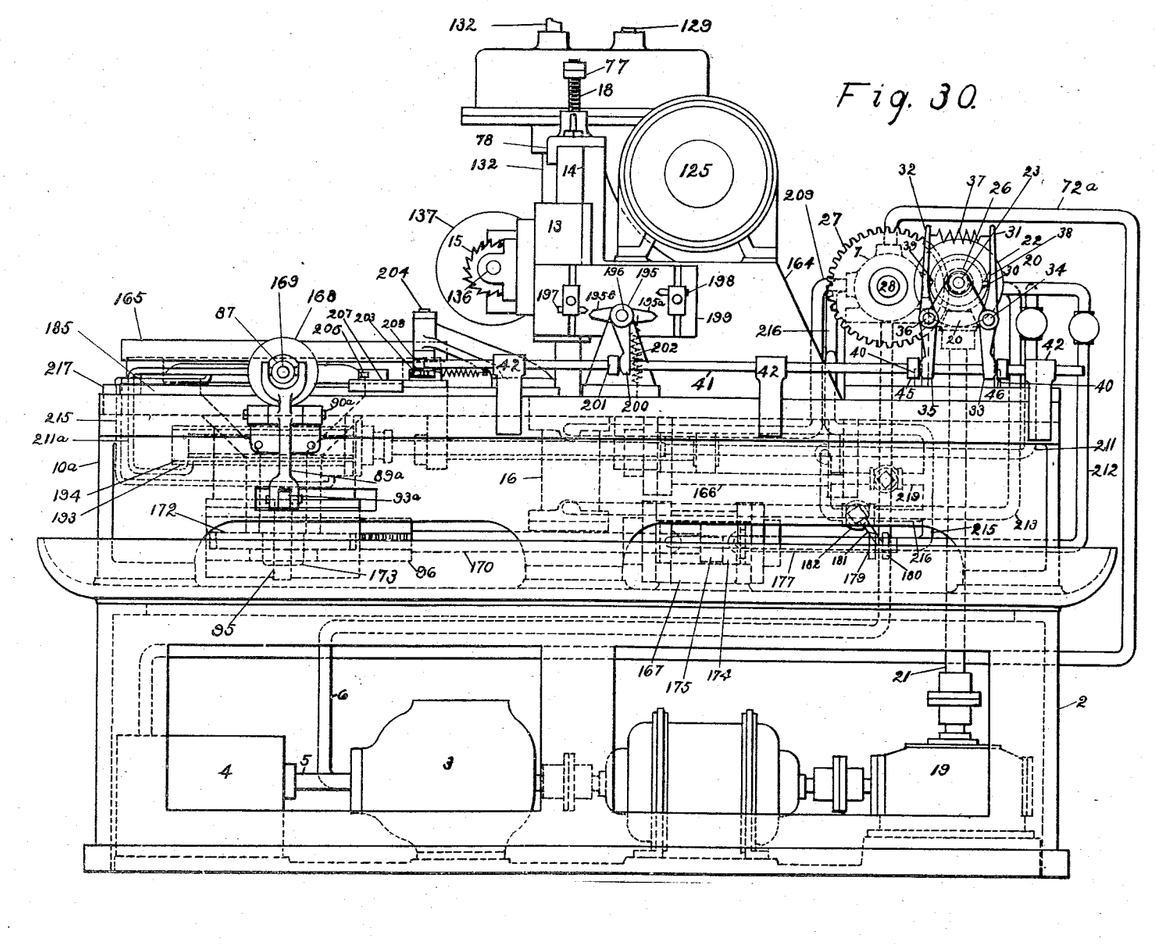
Fig. 30 is a side elevation of another embodiment of my invention.

Referring to Figs. 24 and 29, the lock-bolt 84 is pivotally connected, at 140, to lever 139, and lever 139 is fulcrumed, at 141 to the stationary frame work of the machine. The tapered locking wedge 142, extending to one side at the opposite end of lever 139 is adapted to fit snugly in the wedge-shaped notch 147 in turret 85. The roll 143 is pivotally mounted on lever 139, at 144, and its periphery extends beyond the end of wedge 142. This roll engages and rolls on the circular surface 145 of turret 85 and prevents locking wedge, and piston 83, advancing until turret 85 has completed its required movement. When turret 85 has completed its rotation, roll 143 is forced into the semi-circular cut 146, and wedge 142 is forced into notch 147, thus holding turret 85 firmly in position.

It will be seen by the foregoing that piston 83 cannot act to cut off the flow of fluid to cylinder 99, to stop the rotation of turret 85, until it is completely indexed.

The port 111 in cylinder 99 is nearly closed by piston 98 as it reaches the end of its stroke, and port 111 is elongated, and narrowed at the far end of the stroke, (see Fig. 23), so that the exhaust is gradually choked as the piston 98 nears the end of its movement, resulting in decelerating the movement of piston 98, and turret 85, at this time, thus bringing turret 85 to a gradual stop.

The pipe 112, connects pipe 109 to the extreme right end of the cylinder 99, and check valve 112a prevents the flow of the fluid from cylinder 99 to pipe 109, through pipe 112, but allows free flow of fluid in the opposite direction, to start piston 98 on its movement to the left.

When piston 98 moves to the right fluid flows from the right end of the cylinder 99, through pipe 109, and exhaust pipe 113, to tank 4. When piston 98 moves to the left, fluid flows from the left end of cylinder 99 through pipes 108 and 113 to tank 4.

From the foregoing it will be seen that it is impossible for the turret lock to act to unlock the turret until the cutters have been raised to clear the work and that the turret can not be rotated until the locking bolt is entirely withdrawn to allow free rotation of turret 85. Also that motor 99 cannot act to rotate turret 85 until rack 96 is meshed with gear 100, and that motor 99 cannot act to return piston 98, until rack 96 is disengaged from gear 100.

The valve 114, in pipe 106, regulates the flow of fluid to motor 99; and valve 115, in pipe 82, regulates the flow of fluid to motor 81.

The valve 116, in pipe 75, regulates the flow of fluid to cylinder 12 while carriage 8, and cutters 15, advance toward, and while they are performing their operation on work 55. The two arm lever 117, adjustably mounted on the stem of valve 116, serves to open, and partially close, valve 116. The bar 118, adjustably fastened in bracket 119 attached to carriage 8, and sliding in bearing 118a, carries roll 120 which, as will be seen, partakes of the movement of carriage 8. When carriage 8 retracts from the work to the right, (Figs. 1 and 6), roll 120 engages arm 117a of lever 117, to open valve 116 during the latter part of the movement of carriage 8, and holds valve 116 open during the first part of the movement of carriage 8 to the left, as it advances the cutters 15 toward the work, thus providing a comparatively rapid movement until the cutters are about to enter the work.

Just before cutters 15 have advanced to enter the work 55, roll 120 engages arm 117b, of lever 117, and turns lever 117 to the position shown in dotted lines, (see Fig. 6), partially closing valve 116, and restricting the flow of fluid to cylinder 12, thus reducing the speed of carriage 8, and cutters 15 to the proper cutting feed. If it is desired to change the feed, the thumb screw 121, in lever 117, may be loosened and the stem of valve 116 slightly adjusted, one way or the other as the case requires, and the screw 121 again tightened.

The by-pass pipe 75a is connected at either end to pipe 75, in a manner to allow free flow of fluid between valve 7, and cylinder 12; but the check valve interposed in pipe 75a prevents flow of fluid from valve 7 to cylinder 12, and allows free flow in the opposite direction, as indicated by the arrow. This construction only allows fluid to flow through valve 116 while carriage 8 is advancing, but allows free flow of fluid, causing rapid retracting movement of carriage 8 in the opposite direction.

If it is desired to operate valve 116 a little earlier, or later, relative to the movement of carriage 8, the thumb screw 122, in bracket 119, may be loosened and bar 118 adjusted slightly to the left or right as conditions require.

Referring especially to Figs. 1, 2, 3, and 10, the motor 125 is mounted on carriage 8, and drives shaft 126. The worm 127 is fast on shaft 126, and meshes with worm gear 128, fast on upright shaft 129. The wide face gear 130, is fast on shaft 129, and meshes with gear 131, fast on shaft 132. The worm 133 is fast on shaft 132, and meshes with worm gear 134 fast on cutter block spindle 135. The cutter block spindle drives cutter spindle 136, on which cutters 15 are mounted.

The shafts 126, 129 and 132, are mounted in suitable bearings; and gears 128, 130 and 131, are mounted in suitable housings that are supported by brackets fastened to carriage 8, and partake of the movements thereof.

The cutter block 137, carrying spindle 135, is adjustably fastened to slide 13, and reciprocates therewith, so that cutter block 137, gear 134 worm 133, shaft 132 and gear 131 are raised and lowered with slide 13; the teeth of gear 131 sliding on teeth of gear 130. This eliminates the use of sliding and universal joints in the power transmission thus assuring even speed to cutters 15, conserving power, and greatly reducing wear of parts.

The operation is as follows:—The work being clamped in suitable fixtures attached to turret 85, motors 1, and 125 are started which supplies fluid to the various hydraulic motors and starts cutters 15 revolving. The valve 7 supplies fluid to motor 12, causing carriage 8, and cutters 15, to advance to perform the desired operation, and to cylinder 81 to lock work table 85. Trip block 54 operates lever 49, as shown in Fig. 19 to reset valve 7, thus discontinuing the flow of fluid to cylinder 12, and delivering fluid to cylinder 16 to raise slide 13, and cutters 15, to clear the work. As the upward movement of slide 13 is being completed, block 54 operates lever 49, as shown in Fig. 20, for resetting valve 7 to supply fluid to motor 12 to retract carriage 8, and also motor 81 for unlocking turret 85. At the latter part of the unlocking movement motor-valve 81 supplies fluid to cylinder 99 to rotate turret 85 bringing a new piece of work in position to be operated on by cutters 15 as previously described.

When carriage 8 has sufficiently retracted, block 53 operates on lever 49, as shown in Fig. 21, to cut off the flow of fluid to cylinder 12, thus arresting the movement of carriage 8, and supplies fluid to cylinder 16, for lowering slide 13. When slide 13 has sufficiently lowered, block 53 acts on lever 49, as shown in Fig. 22, to supply fluid to cylinder 12 to again advance carriage 8, and to cylinder 81 to lock turret 85.

It will be understood that, while this cycle of movements is taking place, the operator removes a finished piece of work, and clamps an unfinished piece in place for operation thereon.

Referring to Figs. 24 to 28, most of the parts employed are the same as in the views previously described, the object being to utilize the downward movement of cutters 15 for performing the operation on the work instead of the horizontal movement as previously described.

Lever 49 is operated by blocks 148, and 149 as shown in Figs. 25 to 28.

In Fig. 24 the slide 13 has just completed its upward movement, turret 85 has completed its rotation, and the inclined surface 148a, of block 148 has operated lever 49, as shown in Fig. 26, to reset valve 7a for supplying fluid to the right hand end of cylinder 12, through pipe 159, to advance carriage 8, and cutters 15a, at a comparatively rapid rate. This movement causes block 149 to operate lever 49, as shown in Fig. 25, for resetting valve 7a, to supply fluid to the upper end of cylinder 16, through pipe 151, cylinder 67 and pipe 66, to lower slide 13 and cutters 55a, and to cylinder 81, through pipe 80, to lock cylinder 85.

The valve 153 is interposed in pipe 151, to restrict the flow of fluid to effect the proper cutter feed for cutter 15a.

The pipe 152 is provided to allow free flow of exhaust fluid during the return movement of piston 17, the check valve 154 preventing flow of fluid except for exhaust as indicated by the arrow.

This downward feeding movement of the cutters 15a takes place from the position shown by dotted lines at 156 to position 157 in Fig. 24.

As slide 13 nears its extreme downward movement the inclined surface 149a, of block 149, operates lever 49, as shown in Fig. 27, to reset valve 7a for supplying fluid to the left end of cylinder 12, to retract carriage 8, and cutters 15a, through pipe 158. The valve 150 in pipe 160, regulates the flow of fluid to cylinder 81.

When the carriage 8 has retracted sufficiently, block 148 operates lever 49 as shown in Fig. 28, to reset valve 7a for supplying fluid to the lower end of cylinder 16, through pipe 58, cylinder 61, and pipe 62 to raise slide 13 and cutters 15a to the forward end of cylinder 81, through pipe 160, to unlock turret 85, and to cylinder 99, through pipe 108, to rotate turret 85.

As slide 13 nears the end of its upward movement, block 148 operates upon lever 49, as shown in Fig. 26, for resetting valve 7a to supply fluid to the right hand end of cylinder 12, through pipe 159 to again advance carriage 8.

Referring to Figs. 30 to 40, the stationary bracket 164 is rigidly fastened to table 10a. The slide 13, carrying cutters 15, reciprocates on bracket 164 in the same manner as on carriage 8.

The motor 125 drives cutters 15 in the same manner as previously described, all the driving mechanism connected therewith being identical with that shown in Figs. 1, 2, 3, and 10. The valve 7 and its driving mechanism is also identical with that shown in Figs. 1, 2 and Figs. 11 to 18.

The motor 1, pump 3, and reducing unit 19, are the same as shown in Fig. 1 and perform the same functions.

The turret 165 is similar to turret 85; but instead of bearing 185, in which it rotates, being fastened to table 10a it is reciprocated toward and away from cutters 15, by hydraulic motor 166. The turret 165 is rotated by hydraulic motor 167. The turret lock is operated by hydraulic motor 168, the turret locking mechanism being the same as before described.

Figure 32:
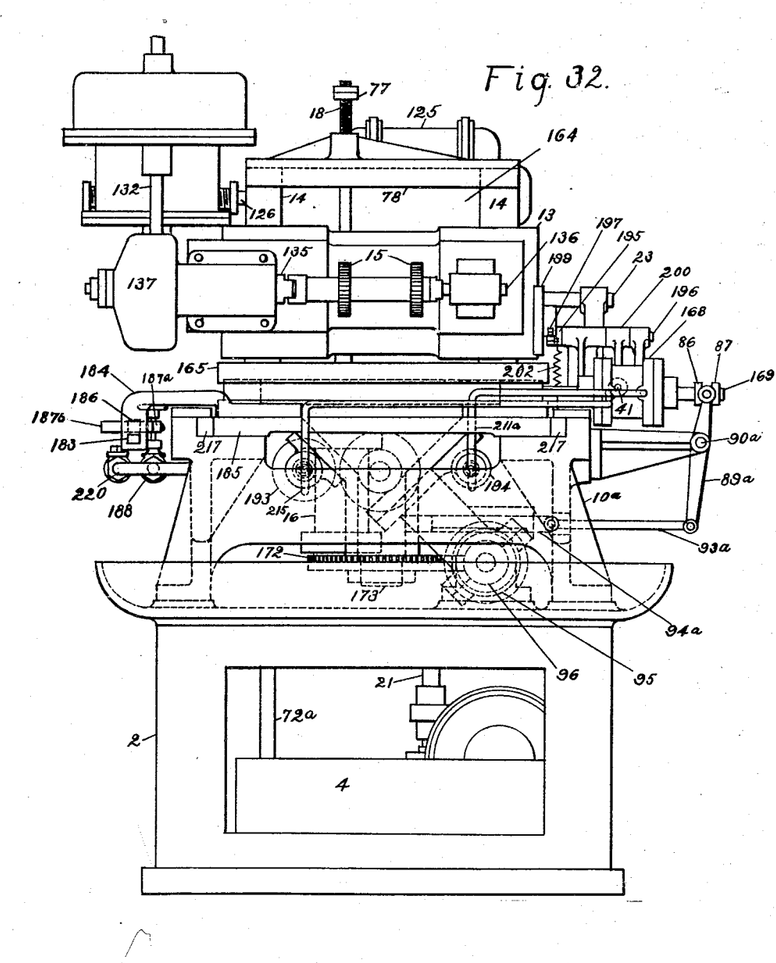
Fig. 32 is an end elevation of the same looking from the left of Fig. 30.
Figures 37, 38, 39, 40:
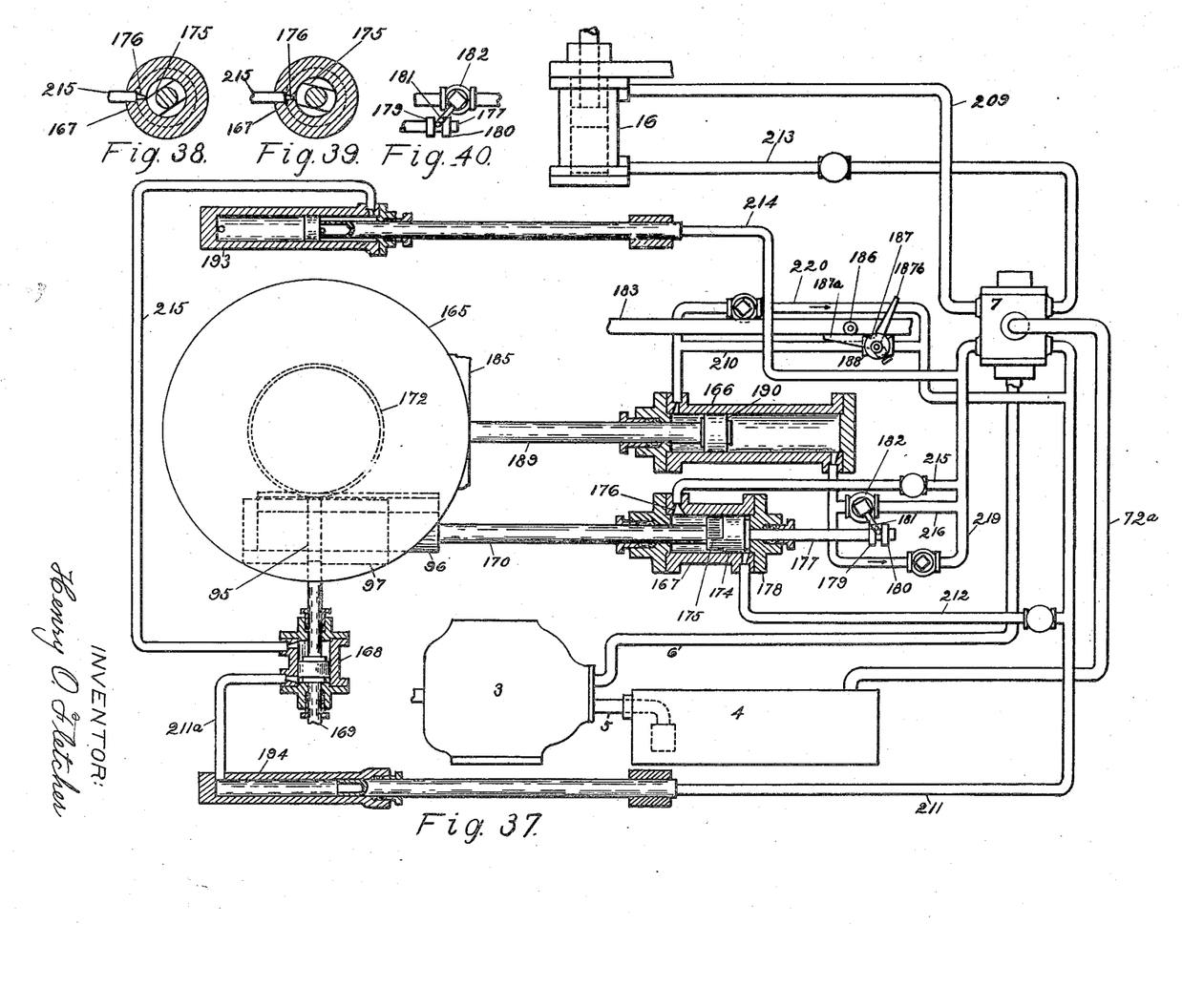
Fig. 37 is a diagrammatical view showing the hydraulic connections used in Figs. 30, 31 and 32.
Figs. 38 and 39 are sectional views of the hydraulic motor for rotating the turret, showing the manner of opening and closing the intake port.
Fig. 40 is a plan view of the valve controlling the intake of the hydraulic motor for reciprocating the turret.

Referring especially to Figs. 32 and 37, the piston 169 extends out through the rear end of motor 168 to which collars 86 and 87 are rigidly attached, and lever 89a fulcrumed at 90a, is operated by piston rod 169 in the same manner as lever 89 is operated by rod 84. The connecting rod 93a is pivotally connected at one end to lever 89a and at the other end to rack 94a thus operating the segment 95 in a manner similar to that shown in Figs. 7 and 8.

The segment 95 oscillates rack 96 in the same manner as shown in Figs. 7 and 8; and, as piston rod 170 is rigidly attached to rack 96, piston 170 is oscillated with rack 96. Piston rod 170 is integral with piston 174, which reciprocates in hydraulic motor cylinder 167 so that when rack 96 is turned into engaging position with gear 172 fast on turret spindle 173 of turret 165, turret 165 is rotated thereby.

Piston 174 is flattened on two sides at its forward end as shown at 175; (see Figs. 37, 38 and 39), and rack 96 is engaged with gear 172 when piston 174 is at its left hand position, so that piston 174 rotates turret 165 during its stroke to the right, see Fig. 37. When piston 174 is at its left hand position and rack 96 is turned out of mesh with gear 172, port opening 176, in cylinder 167, is covered by piston 174, as shown in Fig. 39; but, after rack 96 has been turned into mesh with gear 172, port 176 is uncovered by the flattened portion 175, of piston 174, as shown in Fig. 38, thus delivering fluid to cylinder 167 to propel piston 174 to the right to rotate turret 165.

The rod 177 is integral with piston 174, and extends through the head 178 of cylinder 167. The collars 179 and 180 are adjustably attached to rod 177; the downwardly turned end of lever 181 extends between these collars as shown in Figs. 37 and 40. The lever 181 is fastened to valve 182 in a manner to open and close valve 182 when piston 174 reciprocates in cylinder 167. When piston 174 moves to the right to rotate turret 165, collar 179 engages lever 181 to open valve 182, and when piston 174 moves to the left collar 180 engages lever 181 to close valve 182.

The bar 183 is adjustably attached to bracket 184, which in turn is rigidly attached to turret bearing 185. The roll 186, is pivotally mounted on bar 183 and engages lever arms 187a and 187b, of lever 187, which is adjustably attached to valve 188, in the same manner as lever 117 is attached to valve 116 and operates valve 188 in the same manner as lever 117 operates valve 116. (See Figs. 1 and 6.)

The piston rod 189 is integral with piston 190, which reciprocates in cylinder 166, and rod 189 is rigidly attached to turret bearing 185, which is adapted to reciprocate in ways 192 formed in table 10a.

The cylinders 193 and 194 are attached to turret bearing 185, and function in the same manner, respective to the movement of turret bearing 185, as cylinders 61 and 67, respectively function relative to the movement of carriage 8.

Figure 3:
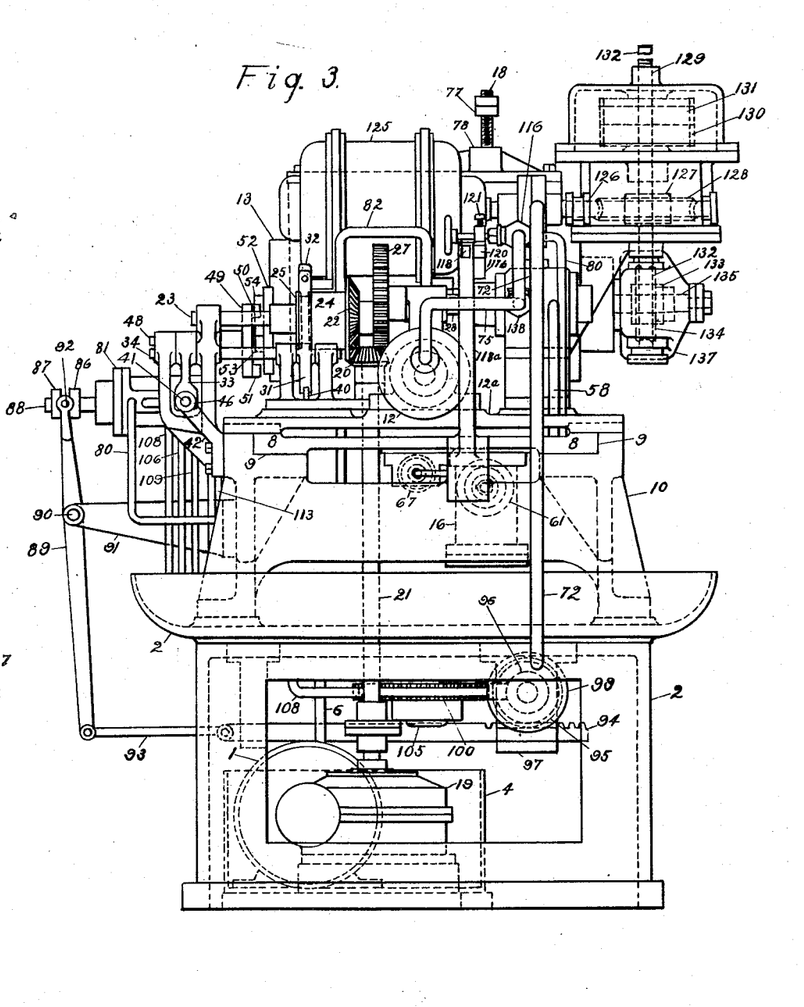
Fig. 3 is an end elevation looking from the right of Fig. 1.
Figures 4, 5:
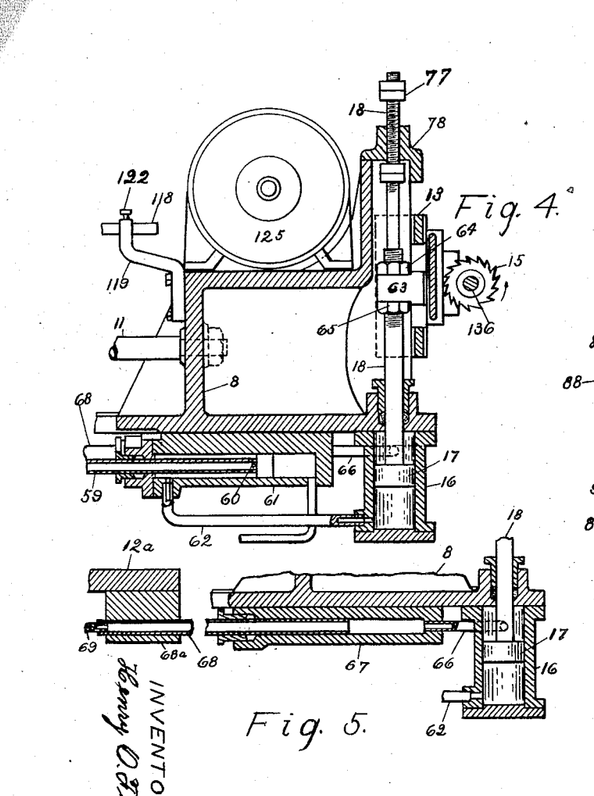
Figs. 4 and 5 are sectional side elevations respectively, showing the manner of operating the vertical slide.

The trip rod 41, collars 45 and 46, levers 31, 32, 33, and 35, clutch members 24 and 25, pinion 26, gear 27 and valve 7 perform respectively the same functions as previously described and shown in Figs. 1 to 3.

The trip lever 195, fast on shaft 196, is adapted to be engaged by dogs 197 and 198. Arm 195a of lever 195 is engaged by dog 198, and arm 195b is engaged by dog 197, respectively. Dogs 197 and 198 are adjustably mounted upon plate 199 which, in turn, is attached to slide 13.

The lever 200 is also rigidly mounted on shaft 196, and is forked at its lower end to straddle rod 41. The forked end of lever 200 engages collar 201, adjustably mounted on rod 41, as shown, and is held in contact therewith by spring 202 fastened at one end to lever 195 and at the other end to table 10a.

When slide 13 raises dog 197 engages arm 195b, rocking lever 195, shaft 196 and lever 200 clockwise, to slide rod 41 to the left; and when slide 13 lowers dog 198 engages arm 195a to again rock shaft 196, and lever 200 clockwise, and slide rod 41 to the left. (See Figs. 34 and 36.)

Figures 31, 33, 34, 35, 36:
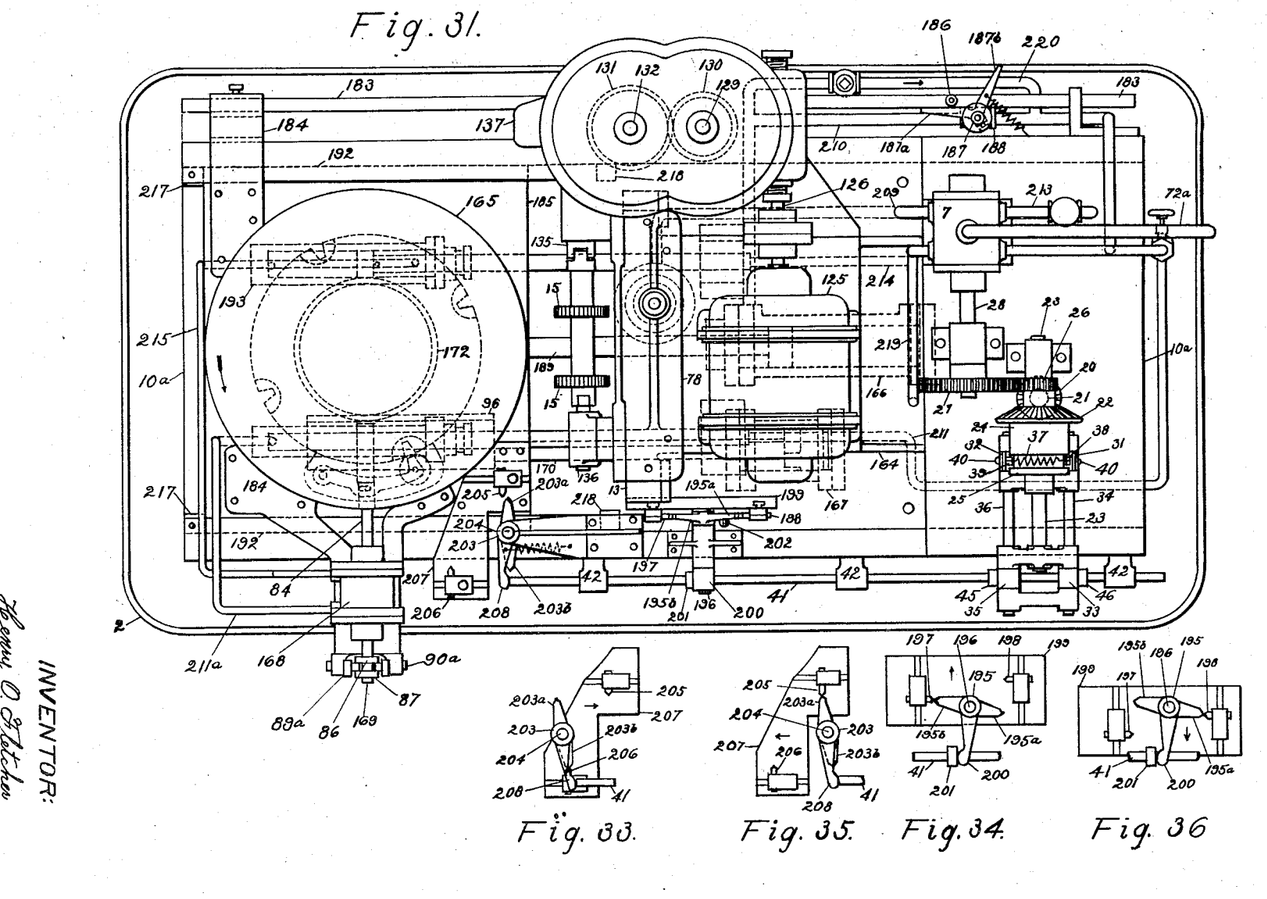

The trip lever 203, composed of the two arms, 203a and 203b, is fast on shaft 204, and the arms 203a, and 203b, are engaged by dogs 205 and 206, respectively, when turret 165 recedes and advances with respect to cutters 15. The dogs 205 and 206 are adjustably mounted on plate 207 which is rigidly fastened to turret bearing 185. Lever 208 is also fast on shaft 204, and bears at its outer end on rod 41 to slide rod 41 to the right when dog 205, or 206 engages the arms of lever 203 to rock shaft 204 anticlockwise as shown in Figs. 33 and 35.

The action is as follows: Assuming the parts to be in the position shown in Figs. 30 and 31, dog 205 has engaged arm 203a (see Fig. 35) to slide rod 41 to the right, thus operating valve 7 to supply fluid to motor 16, through pipe 209, to lower slide 13, and cutters 15, to cutting position.

As slide 13 lowers dog 198 engages lever arm 195a to reset valve 7 for supplying fluid to motor cylinder 166 through pipe 210 to feed turret 165 toward cutters 15 for performing the desired operation, the lever 187 operating to control the feed in the same manner as lever 117, shown in Figs. 1 and 6. Valve 7 also supplies fluid at this setting to supply fluid to cylinder 168 through pipe 211 and cylinder 194 for locking turret 165, and through pipe 212 to cylinder 167 to return piston 174 and rack 96, to initial position.

As turret 165 nears its forward position, with relation to cutters 15, dog 206 engages lever arm 203b to slide rod 41 to the right, thus resetting valve 7 for supplying fluid to cylinder 16, through pipe 213, to raise slide 13 and cutters 15.

When slide 13 has been raised nearly to its upward position dog 197 engages lever arm 195b, to slide rod 41 to the left, resetting valve 7 for supplying fluid to cylinder 168 through pipe 214, cylinder 193 and pipe 215a to unlock turret 165, and to cylinder 167 through pipe 215 to rotate turret 165.

As piston 174 nears the end of its stroke valve 182, in pipe 216 is opened, as previously described, supplying fluid to retract turret 165 away from cutters 15.

It will be noticed that the stroke of piston 174 is not sufficient to give turret 165 its complete rotation, this being completed during the retractive movement of turret 165 by the gear 172 rolling on rack 96.

The stops 217, firmly set on table 10a, limit the retractive movement of turret 165, and the stops 218, also attached to table 10a, limit the advance movement of turret 165 with precision so that rack 96 will engage gear 172 without interference; and stops 218 are also used to determine the exact length of the cutting operation by cutters 15.

The by-pass pipes 219 and 220, respectively, perform the same functions as by-pass pipes 75a and 152, previously described.

The rotary valves 7 and 7a may be replaced by piston valves, and I am aware that many other changes in construction, and arrangement of parts may be resorted to without departing from the spirit and scope of my invention.

Having described my invention what I claim as new, and desire to be protected by Letters Patent is set forth in the following claims:

1. In a milling machine, a cutter, a work table, a first hydraulic motor for reciprocating one of said parts to effect relative advance and return movements between said parts in a plane parallel to said work table; a second hydraulic motor for intermittently rotating the work table; a locking device for locking the work table during said advance movement and unlocking the work table to allow free rotation thereof; a third hydraulic motor for operating the locking device; a fourth hydraulic motor for raising and lowering said cutter; a pump, and hydraulic piping system, for supplying fluid under pressure to said hydraulic motors; a valve for distributing the fluid to the first, third and fourth hydraulic motors; means operated by the advance movement of said reciprocating part for setting the valve to supply fluid to the fourth mentioned motor to raise the cutter; means operative by the raising movement of the cutter for resetting the valve to supply fluid to the first mentioned motor to return said reciprocating part, and to the third mentioned motor for unlocking the work table; means operative by the return movement of the said reciprocating part for resetting the valve to supply fluid to the fourth mentioned motor to lower the cutter; means operative by the lowering movement of the cutter for resetting the valve to supply fluid to the first mentioned motor to advance the cutter; a second valve for supplying fluid to the second mentioned motor; and means operative by the unlocking movement of the locking device for operating the second mentioned valve to supply fluid to the second mentioned motor to rotate the work table.

2. In a milling machine, a cutter, a work table, a first hydraulic motor for reciprocating one of said parts to effect relative advance and return movements between said parts in a plane parallel to the work table; a second hydraulic motor for intermittently rotating the work table; a locking device for locking the work table during the advance movement of said reciprocating part, and unlocking the work table to allow free rotation thereof; a third hydraulic motor for operating the locking device; a fourth hydraulic motor for raising and lowering said cutter; a pump, hydraulic piping system, and valve, for supplying fluid under pressure to said hydraulic motors; means operated by the advance movement of said reciprocating part for setting the valve to supply fluid to the fourth mentioned motor to raise the cutter; means operated by raising movement of the cutter for setting the valve to supply fluid to the first mentioned motor to return said reciprocating part, to the third mentioned motor to operate the locking device for unlocking the work table, and the second mentioned motor to rotate the work table; means operated by the return movement of said reciprocating part for setting valve to supply fluid to the fourth mentioned motor to lower the cutter; and means operated by the lowering movement of the cutter for setting the valve to supply fluid to the first mentioned motor to advance said reciprocating part.

3. In a milling machine, a work table, a cutter, a hydraulic motor for reciprocating one of said parts to effect a relative advance movement for the cutting operation, and a return movement to restore the parts to relative initial position; a pump, and hydraulic piping system, for supplying fluid under pressure to said hydraulic motor; a valve interposed in said piping system for regulating the flow of fluid to said motor; a two arm lever, the arms angularly disposed to each other, adapted to regulate said valve; and a slide, adapted to partake of the reciprocating movements of the reciprocating part, and to engage one arm of said lever during the return movement of the reciprocating part to open said valve, and hold said valve open during the idle advance movement of the cutter toward the work, and to engage the other arm of said lever, to partially close said valve, to reduce the flow of fluid during the cutting operation of the cutter upon the work.

4. In a milling machine, a cutter, a work table, a hydraulic motor for reciprocating one of said parts to effect a relative advance movement between said parts for the cutting operation, and a return movement to restore the parts to relative initial position; a pump, and hydraulic piping system, for supplying fluid under pressure to said motor, said piping system comprising a conduit for supplying fluid to one end of said motor to return said reciprocating part to initial position, a supply conduit to the other end of said motor to advance said reciprocating part, a valve in said second mentioned conduit to regulate the flow of fluid during said advance movement, and a by-pass, having a check valve, in the second mentioned conduit adapted to allow free flow of the exhaust fluid past said regulating valve, but to prevent the flow of fluid in the opposite direction; and means controlled by the movement of the reciprocating part for regulating said control valve to allow free flow of fluid during the idle advance movement of the reciprocating part, and to restrict the flow of fluid during the operation of the cutter upon the work.

5. In a milling machine, a work table, a cutter carrying carriage adapted to reciprocate in a plane parallel to the surface of the work table to produce an advance cutting movement and a return movement; a slide mounted on the carriage for raising and lowering the cutter; means for rotating the work table; a locking device for locking the work table during the operation of the cutter upon the work, and unlocking the work table to allow free rotation thereof; means operative by the advance movement of the carriage for raising the cutter; means operative by the raising movement of the cutter for returning the carriage and operating the locking device to unlock the work table; means operative by the unlocking movement of the locking device for actuating the first mentioned means to rotate the work table; means operative by the return movement of the carriage for lowering the cutter; and means operative by the lowering movement of the cutter for locking the work table and advancing the carriage.

6. In a milling machine, an intermittently rotatable work table; a cutter carrying carriage adapted to reciprocate with relation to the work table; a slide mounted on said carriage for raising and lowering the cutter; a locking device adapted to lock the work table during the operation of the cutter upon the work and unlocking it to allow free rotation thereof; a clutch adapted to be intermittently engaged for actuating mechanisms to reciprocate the carriage, and operate the slide and locking device; means operated by the advance movement of the carriage for engaging the clutch to actuate mechanism for raising the slide; means operated by the raising movement of the slide for engaging the clutch to actuate mechanism for unlocking the work table and returning the carriage; means operated by the unlocking movement of the locking device for rotating the turret; means operated by the return movement of the carriage for engaging the clutch to actuate mechanism for lowering the slide; means operated by the lowering movement of the slide to engage the clutch to actuate mechanism for advancing the carriage and lock the work table.

7. In a milling machine, an intermittently rotating work table, a cutter carrying carriage adapted to reciprocate in a plane parallel to the work table; a slide mounted on the carriage for raising and lowering the cutter; a locking device for locking the work table, during the operation of the cutter upon the work, and unlocking the work table to allow free rotation thereof; a first hydraulic motor for reciprocating the carriage; a second hydraulic motor for raising and lowering the slide; a third hydraulic motor for operating the locking device; a fourth hydraulic motor for rotating the work table; a pump, and hydraulic piping system, for supplying fluid under pressure to said motors; a valve for distributing the fluid to the first, second and third motors; means operated by the advance movement of the carriage for setting the valve to supply fluid to the second motor to raise the slide; means operated by the raising movement of the slide for resetting the valve to supply fluid to the first motor to return the carriage, and to the third motor to unlock the work table; means operated by the return movement of the carriage for resetting the valve to lower the slide; means operated by the lowering movement of the slide for resetting the valve to supply fluid to the third motor to lock the work table, and to the first motor to advance the carriage; a second valve for controlling the flow of fluid to the fourth motor; and means operated by the unlocking movement of the locking device for setting the second mentioned valve to supply fluid to the fourth motor to rotate the work table.

8. In a milling machine, an intermittently revolvable work table, a cutter, means to reciprocate the work table relative to the cutter to produce an advance cutting movement and a return movement; a slide for raising and lowering the cutter; a first hydraulic motor for reciprocating the work table; a second hydraulic motor for rotating the work table; a third hydraulic motor for raising and lowering the slide; a locking device for locking the work table against rotation during the operation of the work by the cutter and unlocking the work table to allow free rotation thereof; a fourth hydraulic motor for operating the locking device; a pump, and hydraulic piping system for supplying fluid under pressure to said motors; a valve interposed in said piping system for distributing the fluid to said motors; means operated by the advance movement of the work table for setting the valve to supply fluid to the third motor to raise the slide; means operated by the raising movement of the slide for resetting the valve to supply fluid to the fourth motor to unlock the work table, to the second motor to rotate the work table, and to the first motor to return the work table; means operated by the return movement of the work table for resetting the valve to supply fluid to the third motor to lower the slide; means operated by the lowering movement of the slide for resetting the valve to supply fluid to the fourth motor to lock the work table, and to the first motor to advance the work table.

9. In a milling machine, a work table, a cutter, a hydraulic motor for reciprocating one of said parts to effect a relative advance movement for the cutting operation, and a return movement to restore the parts to relative initial position; a pump, and hydraulic piping system, for supplying fluid under pressure to said hydraulic motor; a valve interposed in said piping system for regulating the flow of fluid to said motor; a two arm lever, the arms angularly disposed to each other, adapted to regulate said valve, a slide, adapted to partake of the reciprocating movements of the reciprocating part, and to engage one arm of said lever arms during the return movement of the reciprocating part to open said valve, and hold said valve open during the idle advance movement of the cutter toward the work, and to engage the other arm of said lever, to partially close said valve, to reduce the flow of fluid during the cutting operation of the cutter upon the work; and means to adjust said lever relative to said regulating valve.

10. In a machine tool having an intermittently rotatable work holder, a cutter having reciprocable movements with relation to the work holder, a hydraulic motor having a piston connected to a rack adapted to be engaged with and disengaged from a gear fixed to said work holder, a locking device for locking the work holder between rotations and unlocking the work holder to allow free rotation thereof, means operable by the locking movement of the locking device to disengage the rack from the gear, and means operable by said unlocking movement to engage the rack with the gear and supply fluid under pressure to said motor to rotate the work holder.

11. In a machine of the class described having an intermittently rotatable work holder, and a cutter adapted to have relative reciprocable movement with relation to the work holder, a hydraulically operated motor for rotating the work holder, means for supplying fluid under pressure to said motor, a locking device for locking and unlocking the work holder, means operable by the locking device for connecting the motor with and disconnecting the motor from the work holder and to control fluid under pressure for operating said motor.

12. In a machine tool, a rotatable work-holder, a cutter having a relative reciprocating movement with relation to the work-holder, means including a hydraulic motor for rotating the work-holder between successive operations by the cutter on the work, fluid pressure means for operating the motor, a locking device for locking the work-holder during operations of the cutter on the work and unlocking the work-holder to allow free rotation thereof, means operable by the movement of the locking device for controlling the motor, and means to retard the movement of the motor during the latter part of the rotation of the work-holder by gradually restricting the flow of the fluid thus bringing the work-holder to a gradual stop.

13. In a machine tool having a cutter and a work holder, means including a hydraulic motor for reciprocating one of said parts for performing a cutting operation upon the work and returning said part to initial position, a pipe line for supplying fluid under pressure to one end of the motor for advancing said reciprocating part, a pipe line for supplying fluid to the other end of the motor for returning said part, a valve in the first mentioned pipe line, a by-pass having a check valve in the first mentioned line for allowing flow of exhaust fluid only by said valve, means controlled by the movement of the reciprocating part for opening said valve during said return movement and maintaining it open during the idle advance movement of the cutter, and for maintaining the valve partially closed during the operation of the cutter upon the work.

14. In a milling machine a work-holder and a cutter having relative reciprocatory movement with relation to each other in a first path to relatively advance one of said parts to perform a cutting operation on the work and to restore the parts to relative initial position, a first hydraulic motor for reciprocating the reciprocating part, means including a second hydraulic motor for moving the cutter in a second path to clear the work during the restoring movement of the reciprocating part and returning the cutter to operative position, means including a valve for distributing fluid under pressure to the motors, means operative by the movement of the reciprocating part during the cutting operation for setting the valve for supplying fluid to the second motor to move the cutter in the second path to clear the work, means operable by the clearing movement of the cutter for resetting the valve to supply fluid to the first motor for restoring the reciprocating part to initial position, means operable by the restoring movement of the reciprocating part for resetting the valve for supplying fluid to the second motor to return the cutter to operative position, means operable by the return movement of the cutter to operative position for resetting the valve to supply fluid to the first motor to advance the reciprocating part, adjustable stops for positioning the cutter at each end of its movements in the second path, and means to retain pressure in the second motor to hold the cutter with rigidity at the end of its movements in the second path by reason of said continued pressure working against said stops during the succeeding movements of the reciprocating part.

15. In a machine tool a cutter and a work holder, means to reciprocate one of said parts to effect a relative advance movement for the cutting operation and a retractive movement for returning the reciprocating part; a source of fluid pressure for said motor; a first pipe line leading from said source to one end of said motor for supplying fluid to advance said reciprocating part, and a second pipe line leading from said source to the other end of said motor for retracting said reciprocating part; a valve in said first line for regulating the flow of the fluid to said motor; a lever adapted to open and partially close said valve; and means operative by the movement of the reciprocating part to operate the lever to open the valve during said retractive movement and to retain the valve in open position during the idle advance movement of the reciprocating part, and to partially close the valve to restrict the flow of fluid to said motor during the cutting operation.

16. In a device of the class described, a work holding element and a cutter holding element; means to reciprocate one of said elements, relative to the other in a first path, to effect an advance cutting movement and return the reciprocating element to initial position; an intermittently rotatable turret mounted on the work holding element, having a plurality of fixtures for holding, and carrying, the work from one station to another as the turret rotates; a cutter carrying slide for retracting the cutter, in a second path, to clear the work during the turret rotation, and restoring the cutter to the plane of operation; a turret lock for locking the turret firmly in position, during the cutting operation, and unlocking it to allow free rotation thereof; means, operable by the advance movement of the reciprocating element, for retracting the slide; means, operable by the retractive movement of the slide, to unlock the turret and return the reciprocating element to initial position; means, operable by the unlocking movement of the turret lock, to rotate the turret; means, operable by the return movement of the reciprocating element, for restoring the cutter to the plane of operation; and means, operative by the restoring movement of the cutter, for locking the turret and advancing the reciprocating element.

HENRY O. FLETCHER.